(12) United States Patent
Shimasaki et al.

(10) Patent No.: US 7,522,109 B2
(45) Date of Patent: Apr. 21, 2009

(54) INFORMATION EQUIPMENT WITH A PLURALITY OF RADIO COMMUNICATION ANTENNAS

(75) Inventors: Hiroshi Shimasaki, Hamura (JP); Masao Teshima, Kunitachi (JP); Satoshi Mizoguchi, Ome (JP); Anwar Sathath, Ome (JP); Toshiyuki Hirota, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/802,149

(22) Filed: May 21, 2007

(65) Prior Publication Data

US 2007/0273595 A1 Nov. 29, 2007

(30) Foreign Application Priority Data

May 29, 2006 (JP) ............... 2006-148799

(51) Int. Cl.
 *H01Q 1/24* (2006.01)
(52) U.S. Cl. ............... 343/702; 343/700 MS; 343/725; 343/745; 343/872; 343/876; 343/893
(58) Field of Classification Search .......... 343/700 MS, 343/702, 725, 745, 872, 876, 893
See application file for complete search history.

(56) References Cited

U.S. PATENT DOCUMENTS

| | | | | |
|---|---|---|---|---|
| 6,509,877 | B2 * | 1/2003 | Masaki | ............... 343/702 |
| 7,043,209 | B2 * | 5/2006 | Hirota | ............... 455/101 |
| 2006/0079290 | A1 * | 4/2006 | Seto et al. | ............... 455/562.1 |

FOREIGN PATENT DOCUMENTS

| | | |
|---|---|---|
| JP | 08-149055 | 6/1996 |
| JP | 11-098046 | 4/1999 |
| JP | 2001-103568 | 4/2001 |
| JP | 2001-184149 | 7/2001 |
| JP | 2001-230614 | 8/2001 |
| JP | 2002-010360 | 1/2002 |
| JP | 2002-027552 | 1/2002 |
| JP | 2002-073210 | 3/2002 |
| JP | 2003-037538 | 2/2003 |
| JP | 2005-217909 | 8/2005 |
| JP | 2007-074446 | 3/2007 |
| WO | WO 2004/093346 | 10/2004 |

OTHER PUBLICATIONS

Japanese Office Action dated Jun. 10, 2008 for Appln. No. 2006-148799.

* cited by examiner

*Primary Examiner*—Douglas W. Owens
*Assistant Examiner*—Chuc Tran
(74) *Attorney, Agent, or Firm*—Pillsbury Winthrop Shaw Pittman, LLP

(57) ABSTRACT

Information equipment according to an embodiment includes a display housing with a display unit, a first radio communication antenna disposed at an end part of the display housing, a second radio communication antenna using a frequency band adjacent to or overlapped with that of the first radio communication antenna, and a third radio communication antenna disposed at an end part between the first and the second radio communication antennas, and uses a frequency band not adjacent to nor overlapped with those of the first and the second radio communication antennas.

7 Claims, 5 Drawing Sheets

| TX Mode | Low channel Frequency | | Mid channel Frequency | | High channel Frequency | |
|---|---|---|---|---|---|---|
| GSM 850 | 824.2 | MHz | 836.6 | MHz | 848.8 | MHz |
| EGSM 900 | 880.2 | MHz | 897.6 | MHz | 914.8 | MHz |
| GSM 900 | 890.2 | MHz | 902.4 | MHz | 914.8 | MHz |
| DCS/GSM 1800 | 1710.2 | MHz | 1748 | MHz | 1784.8 | MHz |
| PCS GSM 1900 | 1850.2 | MHz | 1880 | MHz | 1909.8 | MHz |
| 3G UMTS(Band I) | 1922.4 | MHz | 1950 | MHz | 1977.6 | MHz |

| RX Mode | Low channel Frequency | | Mid channel Frequency | | High channel Frequency | |
|---|---|---|---|---|---|---|
| GSM 850 | 869.2 | MHz | 881.6 | MHz | 893.8 | MHz |
| EGSM 900 | 925.2 | MHz | 942.6 | MHz | 959.8 | MHz |
| GSM 900 | 935.2 | MHz | 947.4 | MHz | 959.8 | MHz |
| DCS/GSM 1800 | 1805.2 | MHz | 1843 | MHz | 1879.8 | MHz |
| PCS GSM 1900 | 1930.2 | MHz | 1960 | MHz | 1989.8 | MHz |
| 3G UMTS(Band I) | 2112.4 | MHz | 2140 | MHz | 2167.6 | MHz |

FIG. 8

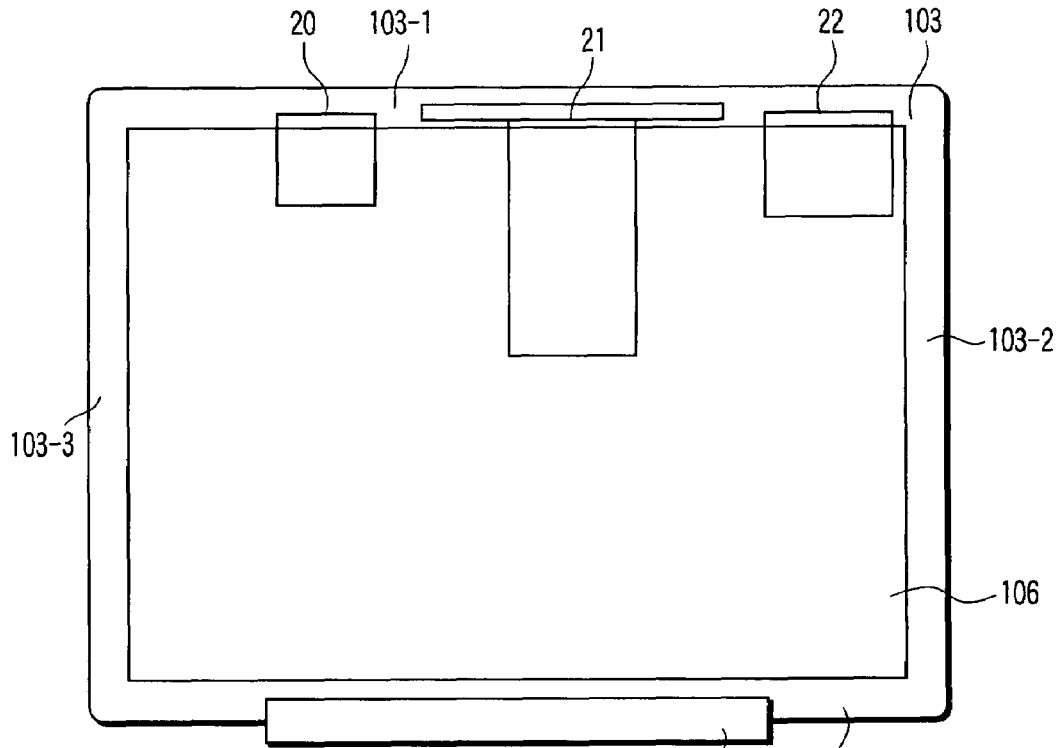

FIG. 9

INFORMATION EQUIPMENT WITH A PLURALITY OF RADIO COMMUNICATION ANTENNAS

CROSS-REFERENCE TO RELATED APPLICATIONS

This application is based upon and claims the benefit of priority from Japanese Patent Application No. 2006-148799, filed May 29, 2006, the entire contents of which are incorporated herein by reference.

BACKGROUND

1. Field

An embodiment of the present invention relates to information equipment with a plurality of radio communication antennas, and more particularly, relates to information equipment, such as a personal computer (hereinafter, referred to as PC), which has an antenna to be used for a radio system in which frequency bands are adjacent to one another, or overlapped with one another.

2. Description of the Related Art

A laptop PC with a radio communication antenna has been developed up to now. For example, Jpn. Pat. Appln. KOKAI Publication No. 2002-73210 discloses a configuration to mount a plurality of radio communication antennas at upper end parts of a display unit (LCD) attached to a main body.

BRIEF DESCRIPTION OF THE SEVERAL VIEWS OF THE DRAWINGS

A general architecture that implements the various features of the invention will now be described with reference to the drawings. The drawings and the associated description are provided to illustrate embodiments of the invention and not to limit the scope of the invention.

FIG. 8 is an exemplary view depicting frequency ranges of antennas to be used for a cellular system;

FIG. 9 is an exemplary view depicting an antenna arrangement regarding the second embodiment of the invention;

DETAILED DESCRIPTION

Figure 1A:
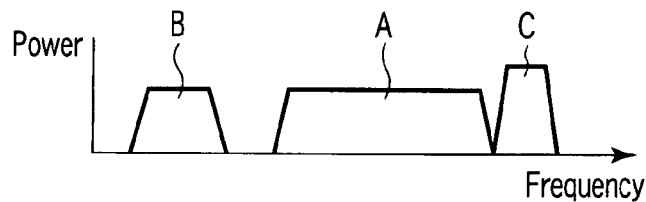
FIG. 1A is a first exemplary view depicting frequency bands of three radio systems A, B and C in a first example of an embodiment of the invention.

Various embodiments according to the invention will be described hereinafter with reference to the accompanying drawings. In general, according to one embodiment of the invention, there is provided information equipment, comprising: a display housing which is equipped with a display unit; a first radio communication antenna which is disposed at an end part of the display housing; a second radio communication antenna which is disposed at an end part of the display housing, and uses a frequency band adjacent to or overlapped with that of the first radio communication antenna; and a third radio communication antenna which is disposed at an end part of the display housing between the first radio communication antenna and the second radio communication antenna, and uses a frequency band not adjacent to nor overlapped with those of the first and the second radio communication antennas.

Hereinafter, embodiments of the invention will be described in detail by referring to the drawings.

A basic concept of the embodiment will be described firstly. Here, the case in which radio communication antennas (hereinafter, simply referred to as antennas) corresponding to radio systems the frequency bands of which are adjacent or overlapped are mounted in a PC, etc., will be set forth.

A first example will be described. FIG. 1A is a view illustrating frequency bands of three radio systems A, B and C. As cleared from FIG. 1A, the frequency bands of the radio system A and the radio system C are adjacent to each other. In contrast, the radio system B uses a frequency band apart from those of the radio systems A and C.

Figure 1B:
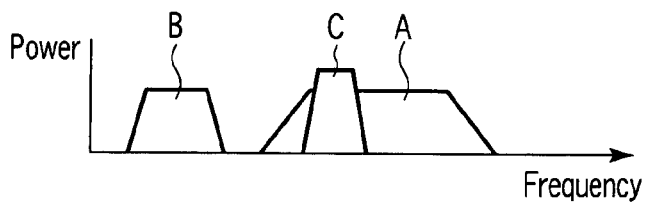
FIG. 1B is a second exemplary view depicting frequency bands of three radio systems A, B and C in the first example of the embodiment of the invention.

FIG. 1B is a view illustrating the frequency bands of three radio systems A, B and C. As cleared from FIG. 1B, the frequency bands of the radio system A and the radio system C are overlapped with each other. In contrast, the radio system B uses a frequency band apart from those of the radio systems A and C in the same way as that of FIG. 1A.

In such cases of FIG. 1A and FIG. 1B given above, arranging the antenna to be used for the radio system A and the antenna to be used for the radio system C so as to be adjacent to or overlapped with each other causes interference and deteriorates a property in each radio system A and C.

Figure 2:
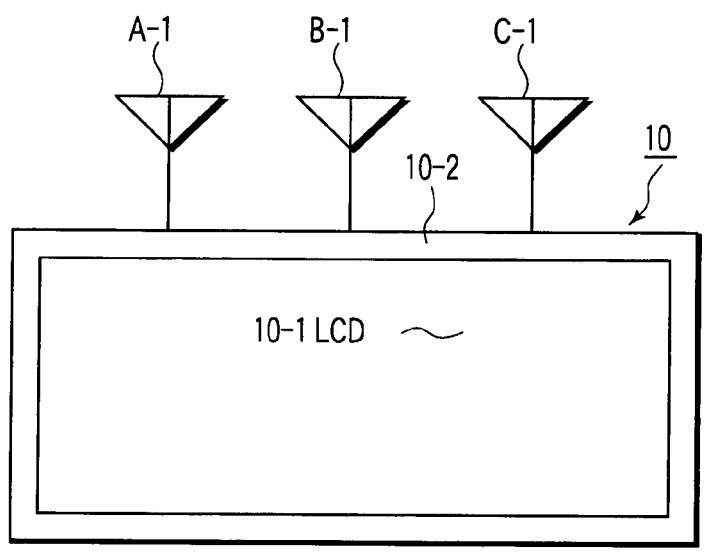
FIG. 2 is an exemplary view depicting a concrete arrangement of antennas in the first example of the embodiment of the invention.

Therefore, in the first embodiment, as shown in FIG. 2, an antenna A-1 to be used for the radio system A and an antenna C-1 to be used for the radio system C are arranged with a prescribed space at an end part 10-2 of a display housing 10 with an LCD 10-1 as a display unit, and an antenna B-1 to be sued in the radio system B using a frequency band differing from those of the radio systems A and C is arranged between the antennas A-1 and C-1. Such an arrangement reduces the in interference between the radio system A and the radio system C to improve the property at each radio system A and C.

Wherein, the end part 10-2 of the display unit 10 is a part and its neighboring which surrounds the LCD 10-1 of the display housing 10. In general, a characteristic of an antenna deteriorating in characteristic by overlapping with the LCD 10-1, the antenna may enhance its characteristic by being arranged at an end part of the display housing 10 so that a power feeding part of the antenna does not overlap with the LCD 10-1.

Figure 3:
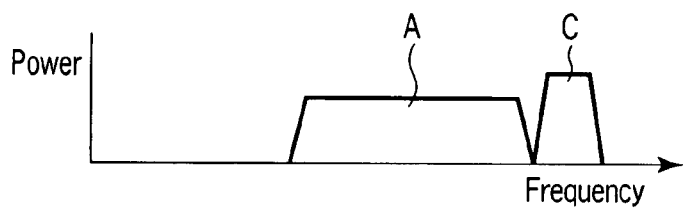
FIG. 3 is an exemplary view depicting frequency bands of two radio systems A and C in a second example of the embodiment of the invention.

Next to this, a second example will be described. FIG. 3 is a view depicting the frequency bands of two radio systems A and C. As cleared from FIG. 3, the frequency bands of the radio systems A and C are adjacent to each other. These arrangements of the antennas, which are adjacent to each other and used for the radio systems A and C, cause interference and deteriorate the property of each radio system A and C.

Figure 4:
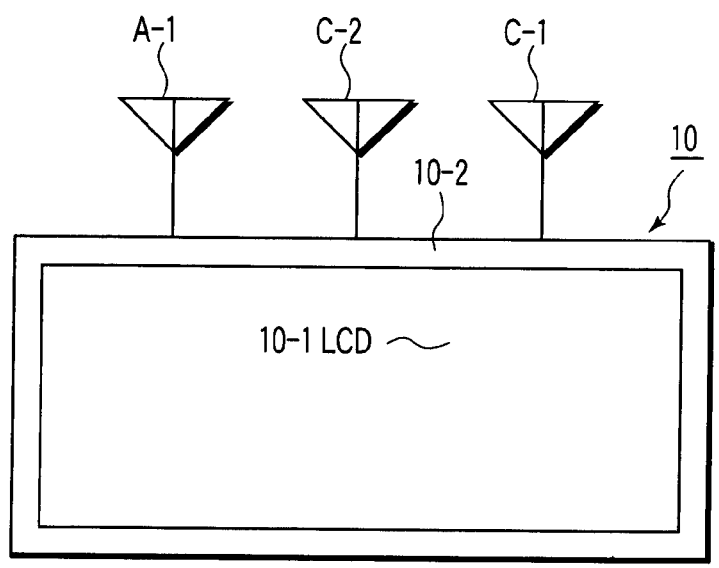
FIG. 4 is an exemplary view depicting a concrete arrangement of antennas in the second example of the embodiment of the invention.

Therefore, in the first embodiment, as shown in FIG. 4, the antenna A-1 to be used for the radio system A and the main antenna C-1 to be used for transmission/reception in the radio system C-1 are arranged with a predetermined space at the end part 10-2 of the display housing 10 with the LCD 10-1 as the display unit. Further, a sub antenna C-2 for reception, which is used in either the radio system A or the radio system C (here, it is supposed to be used in radio system C), is arranged between the antenna A-1 and the antenna C-1.

According to such an arrangement, the interference between the radio system A and the radio system C is reduced, and the property at each radio system A and C is enhanced.

As to an example of this radio system C, for example, a wireless LAN, or the like is a possible approach.

The display housing 10 includes not only a display housing to be connected to a main body housing of information equipment, such as a laptop PC, but also a display housing of information equipment, such as a liquid crystal television receiver in which a display unit and a main body are integrated into each other.

Hereinafter, an antenna arrangement in accordance with a concrete radio system in applying the embodiment to the laptop PC will be described in detail. Specifically, when a plurality of antennas are arranged in small-sized equipment, such as a laptop PC, intervals among each antenna becoming small, the interference among each antenna is likely to occur. Such an antenna arrangement in the embodiment is appropriate to the antenna arrangement in the laptop PC.

Figure 5:
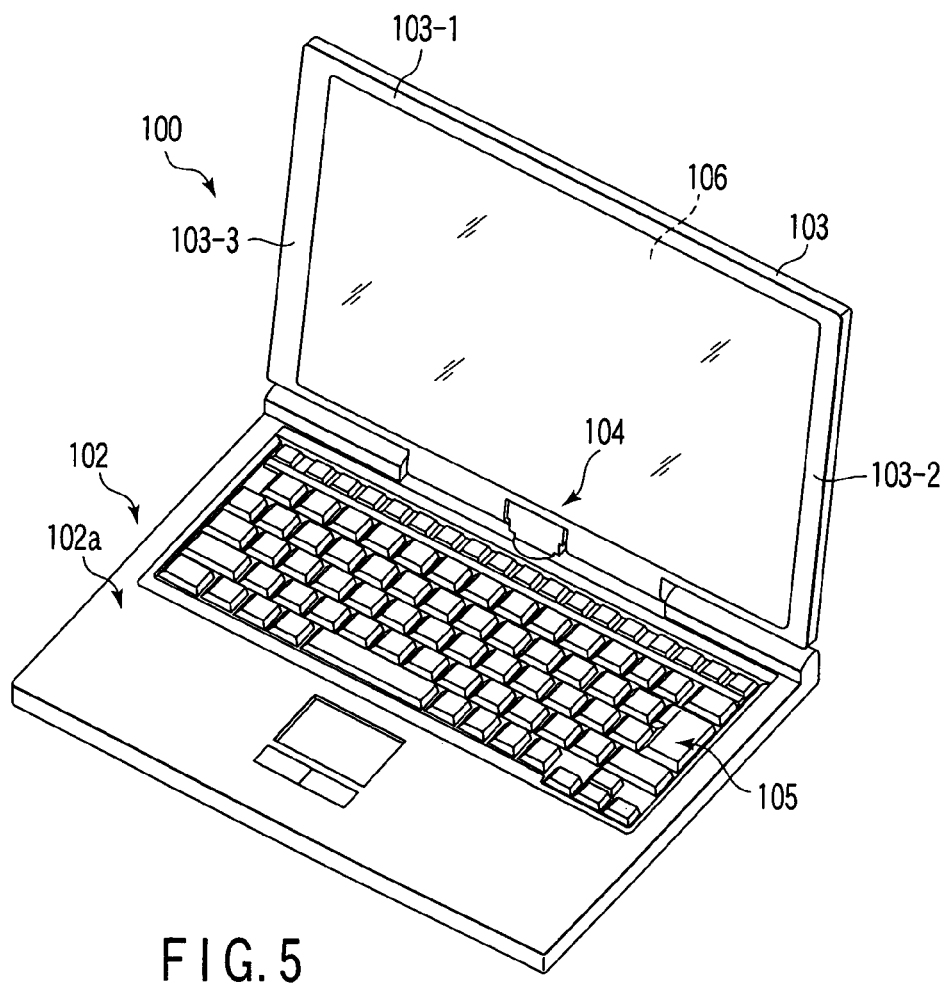
FIG. 5 is an exemplary appearance perspective view of a laptop PC to which the embodiment of the invention is applied thereto.

FIG. 5 is an appearance perspective view of a laptop PC to which the embodiment is applied. A laptop PC 100 consists of a display unit 10, a main body housing 102 to be rotatably connected to the display housing 103 by a hinge unit 104.

Wherein, an end part in almost parallel with a length direction of the hinge unit 104 among the end parts of the display housing 103 is defined as an upper end part 103-1, and right and left end parts almost orthogonal to the length direction of the hinge unit 104 are defined as a right end part 103-2 and a left end part 103-3, respectively. "Right" and "left" used here are corresponding to directions of the right and the left when a user faces an LCD 106 of the display housing 103. The same goes for "upper" and "lower".

As depicted in FIG. 5, the display housing 103 includes the LCD 106 as a display unit. The main body housing 102 has a circuit board with a CPU, etc, mounted thereon, a storage medium, and radio communication modules, which are connected to each antenna through cables, etc (all of them not shown). The main body has them as built-in. Further, a keyboard 105 that is an input means, is disposed on an upper surface 102a.

First Embodiment

Figure 6:
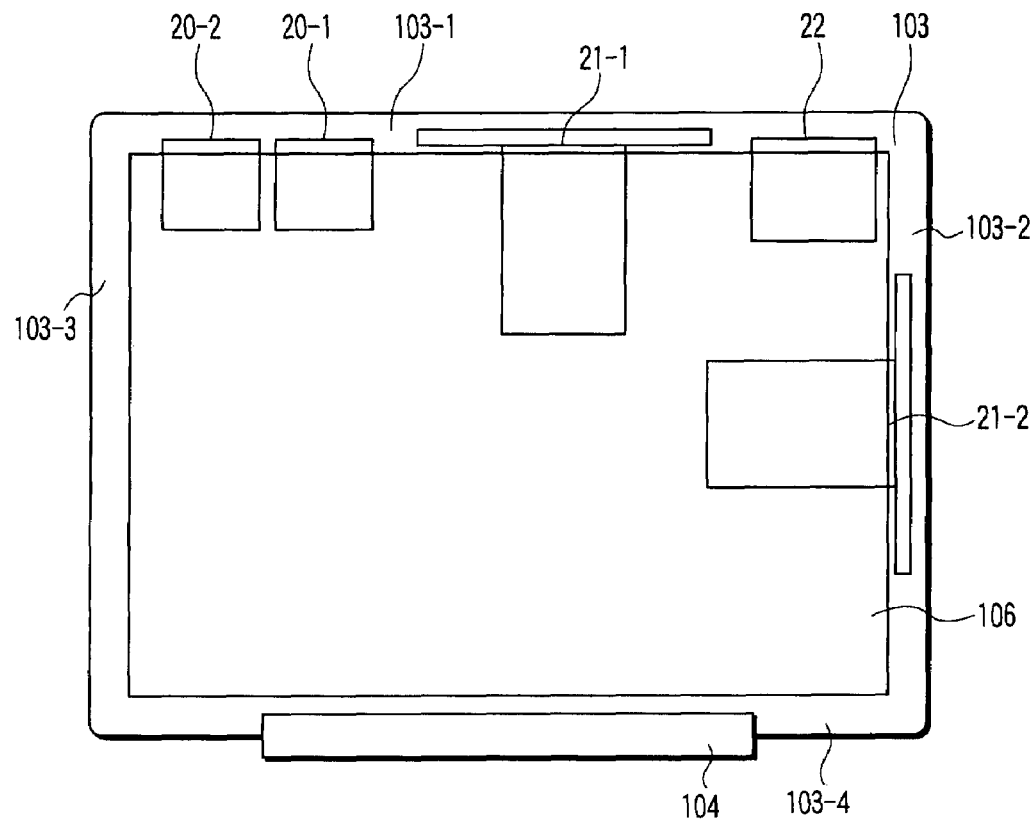
FIG. 6 is an exemplary view depicting an antenna arrangement regarding the first embodiment of the invention.

FIG. 6 is a view illustrating an antenna arrangement regarding the first embodiment of the invention. Antennas 20-1 and 20-2 for wireless LAN (WLAN), an antenna 21-1 for a cellular system, and an antenna 22 for UWB are mounted at the upper end part 103-1 of the display housing 103 in order from the left. An antenna 21-2 for a cellular system is mounted at the right end part 103-2 of the display housing 103. The hinge unit 104 is disposed at the lower end part 103-4 of the display housing 103.

The reason for mounting two pieces of antennas 20-1 and 20-2 for the WLAN is to make the laptop PC 100 have diversity functions. The reason for disposing toe pieces of the antennas 21-1 and 21-2 for the cellular systems is also to make the laptop PC 100 have diversity functions. The antenna 21-1 is a sub antenna, and the antenna 21-2 is a main antenna. The main antenna 21-2 is, for example, an antenna for transmission/reception, and the sub antenna 21-1 is, for example, an antenna for reception only. Here, it is presumed that the cellular systems 21-1 and 21-2 can be used for mobile phone.

Especially, disposing the antennas 21-1 and 21-2 for the cellular system by angles differing by 90-degree from each other and receiving different polarized waves enables enhancing a polarized wave diversity effect. The antennas 21-1 and 21-2 are not adjacent each other, and the UWB antenna 22 are arranged between the antennas 21-1 and 22-2. These antenna arrangements enable enhancing a space diversity effect.

Figure 7:
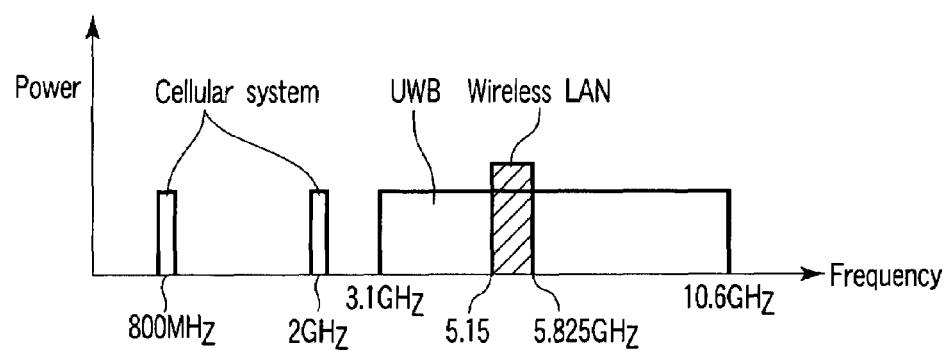
FIG. 7 is an exemplary view depicting frequency bands of three radio systems (wireless LAN, UWB (Ultra Wide Band) and cellular system) in comparison with one another.

FIG. 7 is a view illustrating the frequency bands of the foregoing three radio systems (WLAN, UWB and cellular system) in comparison with one another. FIG. 8 shows the frequency range of the antenna to be used in the cellular system. As cleared from FIG. 7, in general, the frequency band of the WLAN is 5.15-5.825 GHz, and the frequency band of the UWB is 3.1-10.6 GHz. The frequency band of the cellular system is, in general, around 800 MHz and around 2 GHz, and in addition, frequencies between them are used arbitrarily. As shown in FIG. 7, the frequency band of the WLAN and the frequency band of the UWB are overlapped with each other; however, the frequency band of the cellular system is different from those of the two radio systems (WLAN and UWB).

Therefore, in the first embodiment, the antenna 21-1 for the cellular system having different frequency band from those of the two radio systems (WLAN and UWB) is arranged between the antenna 20-1 for the WLAN and the antenna 22 for the UWB. According to such an antenna arrangement, the interference between the radio LAN and the UWB may be decreased, and the properties at the WLAN and the UWB may be improved.

Shown in FIG. 6, the antennas 20-1 and 20-2 for the WLAN and the antenna 22 for the UWB may be replaced with each other.

Furthermore, as shown in FIG. 6, the main antenna 21-2 being arranged at the right end part 10-2 closer to the main housing 102 with the radio communication module (not shown) built therein; the cable length from the main antenna 21-2 to the radio communication module through the hinge unit 104 can be made shorter. Thereby, a cable loss may be decreased to improve the communication performance of the main antenna 21-2. Even when the main antenna 21-2 is disposed at the left end part 103-2, the same effect may be obtained.

Second Embodiment

FIG. 9 is a view showing an antenna arrangement regarding the second embodiment of the invention. The antennas 20-1 and 20-2 for the WLAN, the antenna 21-1 for the cellular system, and the antenna 22 for the UWB are mounted on the upper end part 103-1 of the display housing 103 in order from the left to the right.

According to the configuration of the second embodiment, the antenna 21 for the cellular system having a frequency band differing from those of the two radio systems (WLAN and UWB) is disposed between the antenna 20 for the WLAN and the antenna 22 for the UWB. Depending on such an arrangement, the interference between the WLAN and the UWB is reduced and the characteristic at the WLAN and the UWB are enhanced.

The arrangements of the antenna 20 for the WLAN and the antenna 22 for the UWB shown in FIG. 9 may be replaced with each other.

Third Embodiment

Figure 10:
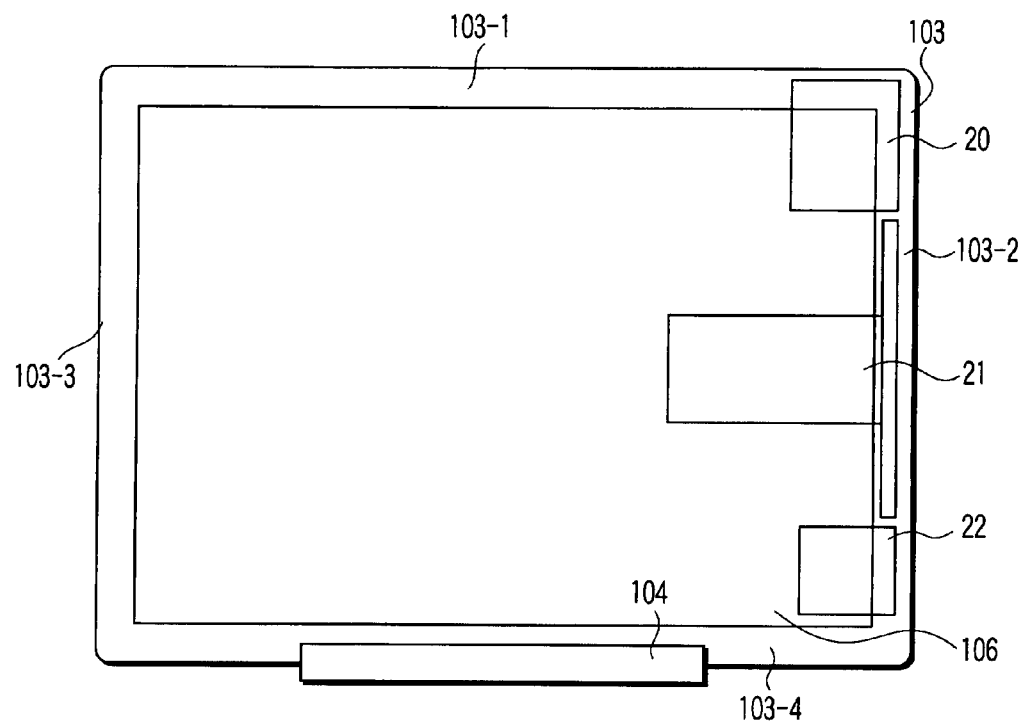
FIG. 10 is an exemplary view depicting an antenna arrangement regarding the third embodiment of the invention.

FIG. 10 is a view depicting an antenna arrangement regarding the third embodiment of the invention. The antenna 20 for the WLAN, the antenna 21 for the cellular system, and the antenna 22 for the UWB are mounted at the right end part 103-2 of the display housing 103 in order from the top to the bottom.

According to the configuration of the third embodiment, the antenna 21 for the cellular system 21 having a frequency band differing from those of the two radio systems (UWB and WLAN) is disposed between the antenna 22 for the UWB and the antenna 20 for the WLAN. Such an arrangement reduces the interference between the WLAN and the UWB to improve the characteristics at the WLAN and the UWB.

The arrangements of the antenna 22 for the UWB and the antenna 20 for the WLAN shown in FIG. 10 may be replaced with each other.

Fourth Embodiment

Figure 11:
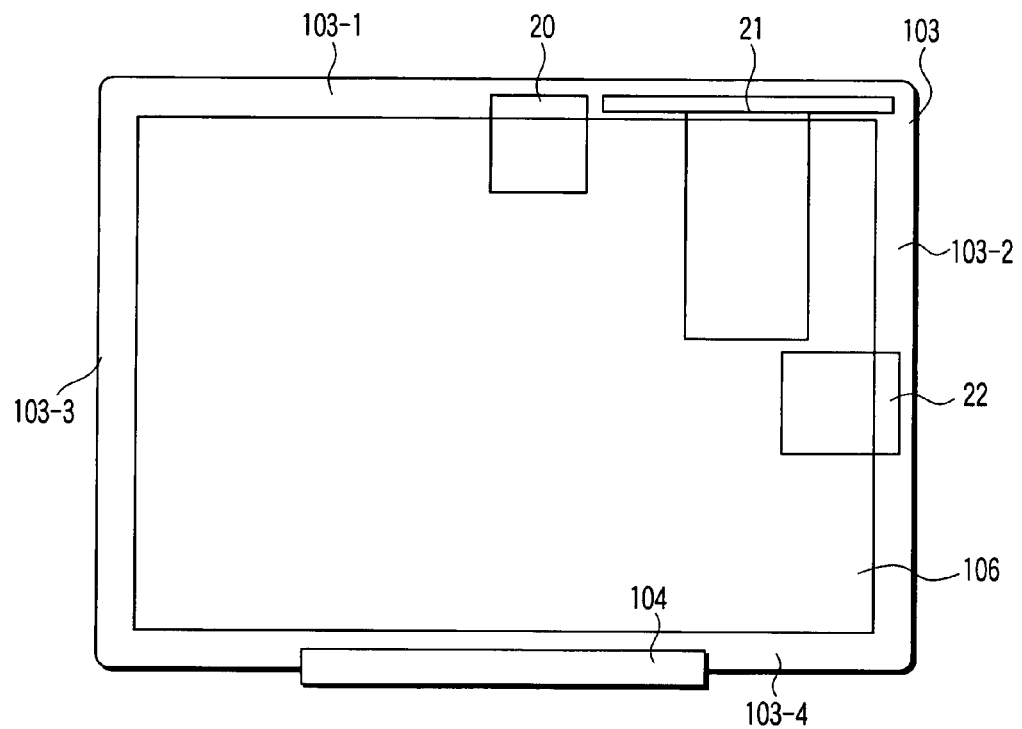
FIG. 11 is an exemplary view depicting an antenna arrangement regarding the fourth embodiment of the invention.

FIG. 11 is a view illustrating an antenna arrangement regarding the fourth embodiment of the invention. The antenna 20 for the WLAN and the antenna 21 for the cellular system are mounted on the upper end part 103-1 of the display housing 103 in order from the left to the right. The antenna 22 for the UWB is mounted to the right end part 103-2 of the display housing 103.

According to the configuration of the fourth embodiment, the antenna 20 for the WLAN and the antenna 22 for the UWB are arranged at two end parts orthogonal to each other, and the antenna 21 for the cellular system having frequency band differing from those of the two radio systems (WLAN and UWB) is disposed therebetween. Such an arrangement decreases the interference between the WLAN and the UWB to improve the characteristics at the WLWN and the UWB.

The distance from the antenna 22 for the UWB up to the radio communication module mounted in the main housing 102 becomes shorter than that from the antenna 20 for the WLAN by disposing the antenna 22 for the UWB at the position close to the hinge unit 104. Usually, a loss becoming bigger in proportion to a communication cable length, the increase ratio of the loss grows as the frequency band to be used for a communication becomes higher. Therefore, it is preferable to arrange the antenna 22 for the UWB which uses a frequency band higher than that of the antenna 20 for the WLAN nearby the hinge unit 104.

The arrangements of the antenna 20 for the WLAN and the antenna 22 for the UWB depicted in FIG. 11 may be replaced with each other.

According to the aforementioned embodiments, the information equipment with the plurality of radio communication antennas becomes possible to decrease the interference among radio systems and improves its characteristics in each radio system.

While certain embodiment of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. Information equipment, comprising:
a display housing which is equipped with a display unit;
a first radio communication antenna which is disposed at an end part of the display housing;
a second radio communication antenna which is disposed at an end part of the display housing, and uses a frequency band adjacent to or overlapped with that of the first radio communication antenna; and
a third radio communication antenna which is disposed at an end part of the display housing between the first radio communication antenna and the second radio communication antenna, and uses a frequency band not adjacent to nor overlapped with those of the first and the second radio communication antennas.

2. The equipment according to claim 1, wherein
the first radio communication antenna makes a radio communication via a wireless LAN;
the second radio communication antenna makes a radio communication in a ultra wide band; and
the third radio communication antenna is an antenna for a cellular system.

3. Information equipment, comprising:
a display housing which is equipped with a display unit;
a first radio communication antenna which is disposed at an end part of the display housing;
a second radio communication antenna which is disposed at an end part of the display housing, and performs transmission and reception in a radio communication system differing from that of the first radio communication antenna; and
a third communication antenna which is disposed at an end part of the display housing between the first radio communication antenna and the second radio communication antenna, and performs reception by using the same frequency band as that of the second radio communication antenna.

4. The equipment according to claim 3, wherein
the second radio communication antenna is an antenna for a wireless LAN capable of performing transmission and reception; and
the third radio communication antenna is an antenna for a wireless LAN and used only for reception.

5. The equipment according to claim 4, wherein the first radio communication antenna makes a radio communication via the wireless LAN; and the second radio communication antenna makes a radio communication in a ultra wide band.

6. The equipment according to claim 1, being a laptop personal computer which further comprises a main body housing rotatably connected to the display housing.

7. The equipment according to claim 3, being a laptop personal computer which further comprises a main body housing rotatably connected to the display housing.

* * * * *